US011814016B2

(12) United States Patent
Cosby et al.

(10) Patent No.: US 11,814,016 B2
(45) Date of Patent: Nov. 14, 2023

(54) VEHICLE CAMERA AND SENSOR WASH VALVE ASSEMBLY

(71) Applicant: Continental Powertrain USA, LLC, Auburn Hills, MI (US)

(72) Inventors: Douglas Edward Cosby, Newport News, VA (US); Stephen C Bugos, Poquoson, VA (US); Michael J. Hornby, Williamsburg, VA (US)

( * ) Notice: Subject to any disclaimer, the term of this patent is extended or adjusted under 35 U.S.C. 154(b) by 1168 days.

(21) Appl. No.: 16/502,519

(22) Filed: Jul. 3, 2019

(65) Prior Publication Data

US 2021/0001811 A1   Jan. 7, 2021

(51) Int. Cl.
*B60S 1/02* (2006.01)
*B05B 1/06* (2006.01)
*G05D 1/02* (2020.01)

(52) U.S. Cl.
CPC ............... *B60S 1/02* (2013.01); *B05B 1/06* (2013.01); *G05D 1/02* (2013.01)

(58) Field of Classification Search
CPC ... B60S 1/02; B60S 1/481; B05B 1/06; G05D 1/02
See application file for complete search history.

(56) References Cited

U.S. PATENT DOCUMENTS

| | | | |
|---|---|---|---|
| 2007/0161970 A1* | 7/2007 | Spohn | A61M 5/007 604/533 |
| 2008/0035211 A1* | 2/2008 | Gerlich | F16K 27/029 137/238 |
| 2015/0121850 A1* | 5/2015 | McFarland | F01N 3/2066 60/274 |
| 2018/0179938 A1* | 6/2018 | Shaull | F01N 3/2892 |
| 2019/0168243 A1* | 6/2019 | Van Vuuren | B05B 1/06 |
| 2019/0359178 A1* | 11/2019 | Hornby | F16K 27/003 |
| 2022/0234544 A1* | 7/2022 | Hornby | F16K 11/24 |

FOREIGN PATENT DOCUMENTS

| | | | | |
|---|---|---|---|---|
| DE | 102015003836 A1 * | 9/2016 | | B60S 1/481 |
| WO | WO-2015135732 A1 * | 9/2015 | | F02M 51/005 |

* cited by examiner

*Primary Examiner* — Lori Lyjak

(57) ABSTRACT

There is disclosed a valve assembly for washing cameras or sensors of an autonomous vehicle. The valve assembly includes a single fluid injector having a fluid inlet, a fluid outlet, and a fluid passage in fluid communication with the fluid inlet and the fluid outlet. A cup is disposed over an upstream portion of the fluid injector, relative to a direction of fluid flow through the fluid injector. A lower housing is disposed over and surrounds a downstream portion of the fluid injector, relative to the direction of fluid flow therethrough. A bracket member extends from the lower housing. The bracket member is configured for connecting to an anchor member for attachment within the autonomous vehicle. In this way, the valve assembly may be easily secured within a vehicle for providing a desired amount of fluid to the lens of the vehicle camera or sensor.

20 Claims, 6 Drawing Sheets

VEHICLE CAMERA AND SENSOR WASH VALVE ASSEMBLY

FIELD OF INVENTION

The present invention is generally directed to a washer system that allows the for selectively targeting camera and sensor lenses with a single pump and tank, and particularly to a single valve assembly therefor.

BACKGROUND

As autonomous vehicle development continues to progress with various sensors and cameras around the exterior of the vehicle, a need has arisen for keeping the lenses of these sensors and cameras clean and functioning properly.

SUMMARY

Example embodiments are generally directed to a valve assembly for a wash system to selectively which cleans the lenses of cameras and sensors of a vehicle. The valve assembly is controlled to selectively provide a wash fluid to a specific camera/sensor lens. The valve assembly includes a single fluid injector and thereby finds use in a vehicle in which a multi-valve manifold assembly cannot be secured in a desired location of the vehicle due to size constraints.

According to an example embodiment, there is shown a valve assembly for washing cameras or sensors of a vehicle, including a fluid injector comprising a fluid inlet, a fluid outlet, and a fluid passage in fluid communication with the fluid inlet and the fluid outlet. A cup is disposed over an upstream portion of the fluid injector, relative to a direction of fluid flow through the fluid injector. A lower housing surrounds a downstream portion of the fluid injector, relative to the direction of fluid flow therethrough. A bracket extends from the lower housing and is configured for connecting to an anchor member for attachment within the vehicle.

The bracket is integrally formed as a unitary member with the lower housing. The bracket extends from an outer radial surface of the lower housing. A longitudinal axis of the lower housing and of the fluid injector is orthogonal to a longitudinal axis of the anchor member when the lower housing is connected thereto.

The bracket may have a prism shape with a pair of lengthwise side segments which form a cutout within the bracket. This allows a portion of the anchor member to be inserted within the cutout when the anchor member is connected to the bracket.

The cup and the lower housing are connected together. The valve assembly further includes an attachment mechanism formed as part of the cup and the lower housing. The attachment mechanism includes at least one arm which extends from one of the cup and the lower housing and at least one tab member disposed on and extending from the other of the cup and the lower housing. The at least one tab member engages with the at least one arm member when the cup and the lower housing are attached to each other.

In an example embodiment, the at least one arm includes a plurality of arm members and a plurality of tab members, each arm member engaging with a tab member when the cup and the lower housing are attached to each other. Each arm may extend from the one of the cup and the lower housing such that a distal end of the arm is resiliently deflectable. Each arm includes a slot or aperture, and each tab protrudes from the other of the cup and the lower housing and is disposed in the slot or aperture of a corresponding arm when the cup is attached to the lower housing.

The valve assembly further includes at least one seal member disposed between an outer surface of the fluid injector and an inner surface of the cup. The at least one seal member fixedly or stably positions the fluid injector within the cup and prevents fluid from passing between the cup and the fluid injector.

The fluid injector includes an input port and the at least one seal member surrounds a portion of the input port.

The valve assembly further includes a seal member disposed between an outer surface of the fluid injector and an inner surface of the lower housing. The seal member prevents fluid from passing between the fluid injector and the lower housing. In an example embodiment, the seal member is disposed against and contacts the outlet port.

The fluid injector may include an actuator unit including a coil, a stationary pole piece, a spring and a movable armature in contact with the spring. The fluid injector may further include a valve unit including a valve seat and a valve needle configured to move with the armature between a closed position in which an end portion of the valve needle engages with the valve seat to prevent fluid from exiting the fluid injector from the fluid outlet, and an open position in which the end portion of the valve needle is spaced apart from the valve seat so as to allow fluid to pass through the fluid injector and exit through the fluid outlet.

BRIEF DESCRIPTION OF THE DRAWINGS

The present invention will become more fully understood from the detailed description and the accompanying drawings, wherein.

DETAILED DESCRIPTION

In the figures and throughout the detailed description, the same reference numbers are used to identify identical or similar elements. For the sake of clarity, the elements are not shown to scale unless otherwise specified.

In general terms, example embodiments of the present disclosure are directed to a valve assembly of a wash system for washing the lenses of cameras and sensors of vehicles, such as autonomous vehicles. The valve assembly is disposed within the vehicle and is in fluid communication between a source of washing fluid and an exit port of the wash system which discharges the washing fluid towards a lens of the vehicle's camera and/or sensor. The wash system may also include a pump or the like which provides the wash fluid under pressure to the valve assembly and other valves in the wash system. In this way, the valve assembly serves to provide washing fluid in relatively precise amounts to the lens of an externally-facing camera and/or sensor of the vehicle.

Figure 9:
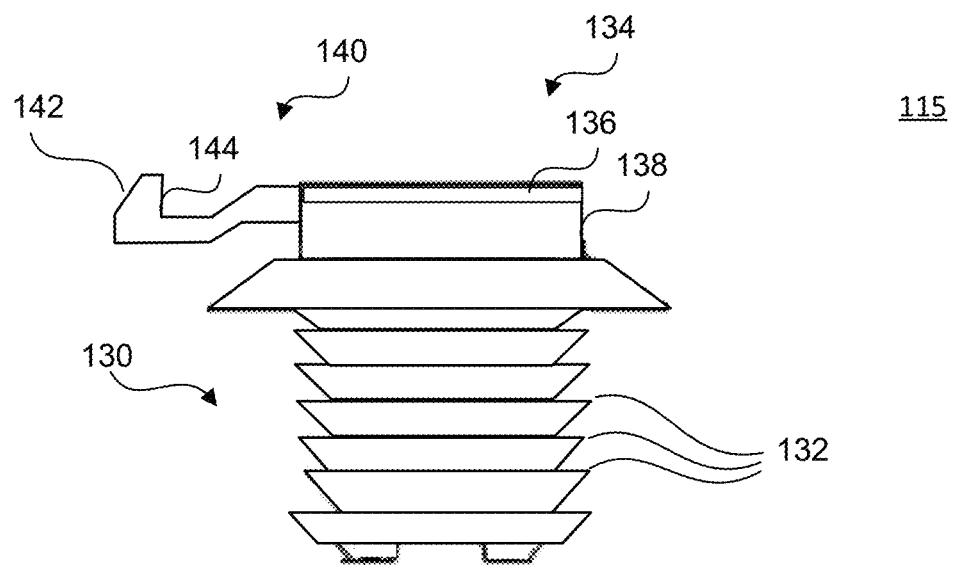
FIGS. 9 and 10 are side and end views, respectively, of the anchor associated with the valve assembly of FIG. 1.
Figure 10:
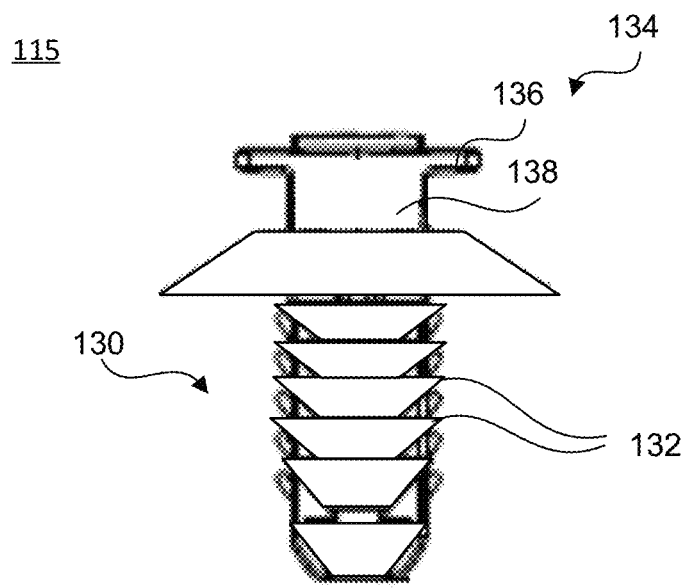
Figure 11:
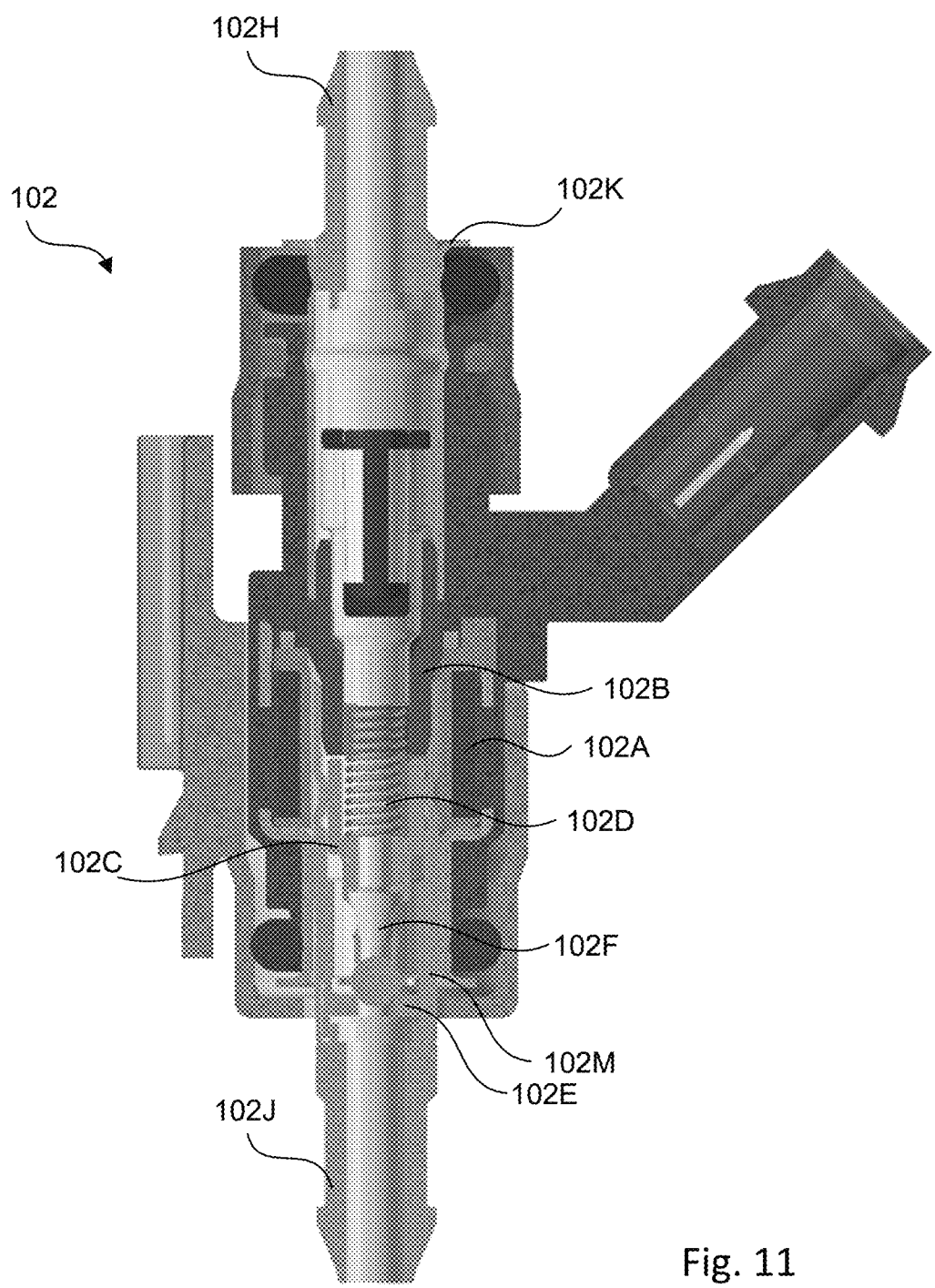
FIG. 11 is a cross-sectional view of the valve assembly of FIG. 1.

FIGS. 1-11 illustrate a valve assembly 100 according to one or more example embodiments. Valve assembly 100 includes a fluid injector 102. In an example embodiment, fluid injector 102 is a conventional fuel injector or injector of a reductant delivery unit. As shown in FIG. 11, fluid injector 102 includes components typically found in a solenoid fuel injector, including an actuator unit having a coil 102A, a stationary pole piece 102B, a moveable armature 102C which moves in response to an electromagnetic force generated from passing a current through coil 102A, and a spring 102D which biases armature 102C. Fluid injector 102 further includes a valve assembly having a valve seat 102E and a valve needle 102F which is coupled to armature 102C for at least partial movement therewith. The valve seat 102E engages with an end of the valve needle 102F when valve assembly 100 is in the closed position to prevent fluid flow through the injector, and is spaced from valve seat 102F when valve assembly 100 is in the open position for passing fluid through the injector. Because fluid injector 102 and its components that are well known, a detailed description of the injector and its operation will not be provided herein for reasons of expediency.

Fluid injector 102 further includes a fluid inlet port 102H and a fluid outlet port 102J. Each of fluid inlet port 102H and fluid outlet port 102J includes a through bore for passing fluid through the port. Fluid inlet port 102H is connected within and is in fluid communication with an inlet tube 102K of fluid injector 102. Fluid outlet port 102J is connected to and in fluid communication with a valve body 102M in which valve seat 102E is disposed. Fluid inlet port 102H and fluid outlet port 102J each includes a largely cylindrical section, and a tapered section in which an outer surface tapers radially inwardly from the largely cylindrical section to the distal end of the port. The widest part of the tapered section near the largely cylindrical section extends radially outwardly further than the largely cylindrical section, thereby creating a ledge between the tapered section and the largely cylindrical section.

Valve assembly 100 further includes a cup or upper housing 104 which is connected to and surrounds an upstream portion of fluid injector 102, relative to a direction of fluid flow through the injector. Cup 104 includes a first portion 104A and a second portion 104B. First portion 104A and second portion 104B are each largely cylindrical in shape, with the inner and outer diameter of first portion 104A being smaller than the inner and outer diameter, respectively, of second portion 104B. First portion 104A and second portion 104B include a through-bore. Fluid inlet port 102H outwardly extends from the through-bore.

Figure 1:
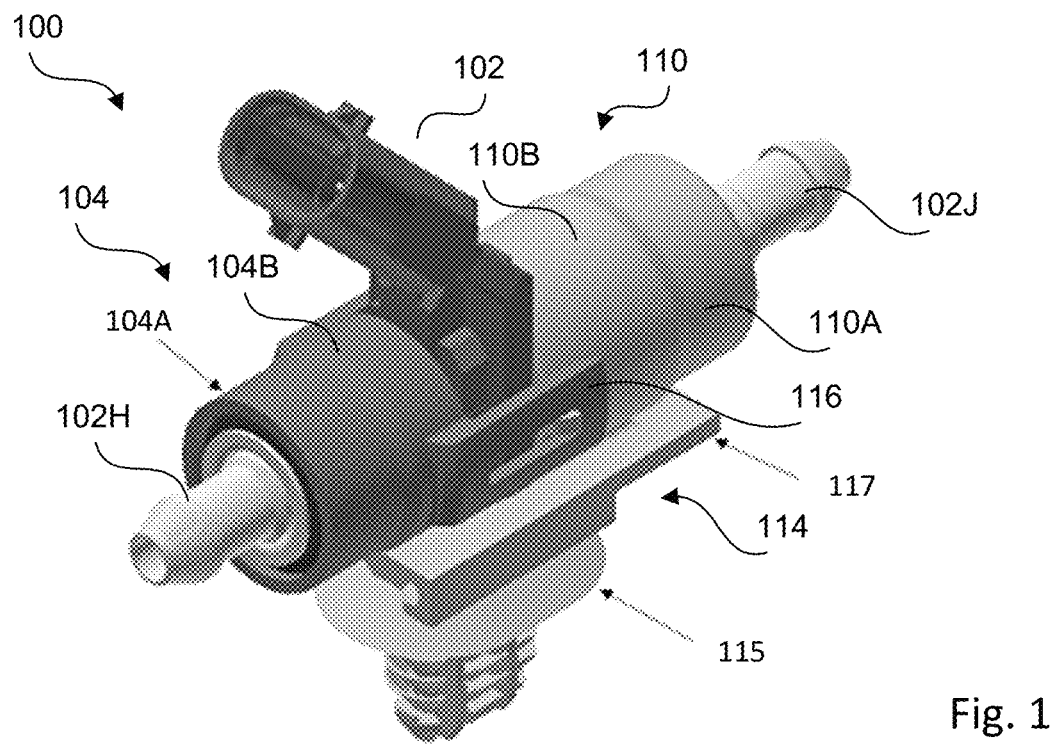
FIG. 1 is a perspective view of a camera sensor wash valve assembly coupled to an anchor, according to an example embodiment.
Figure 2:
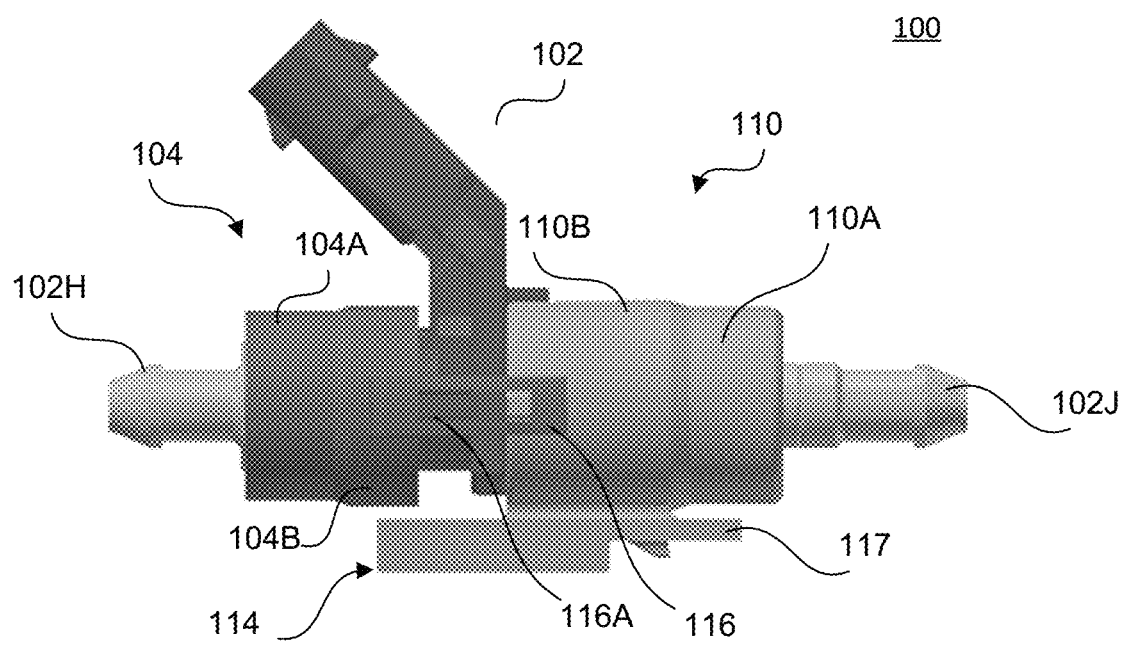
FIGS. 2 and 3 are a side and top plan views, respectively, of the valve assembly of FIG. 1.
Figure 3:
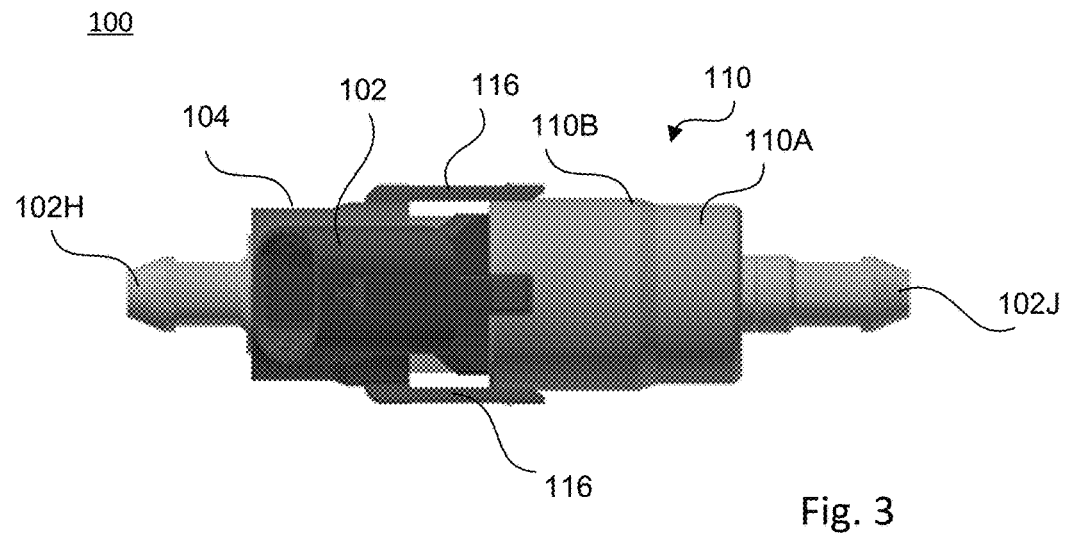
Figure 4:
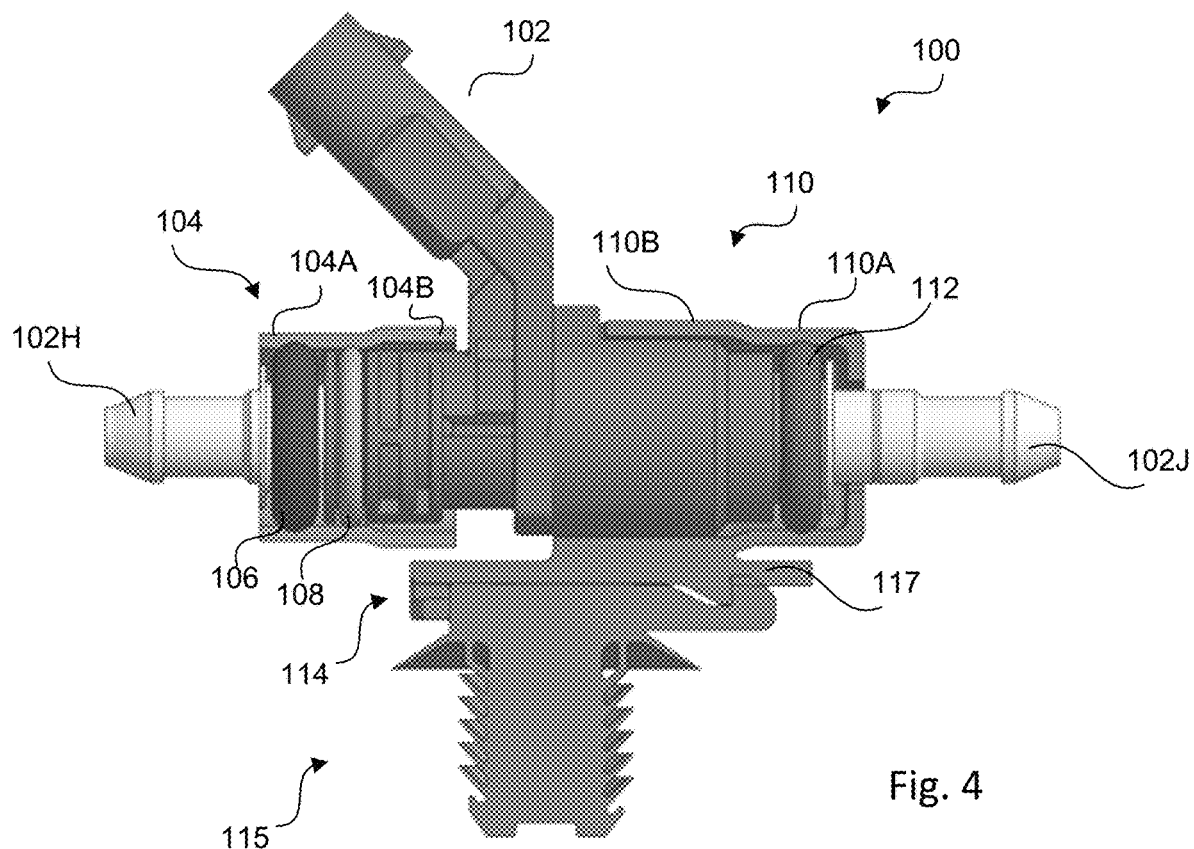
FIG. 4 is a partial cross sectional view of the valve assembly and anchor of FIG. 1.
Figure 5:
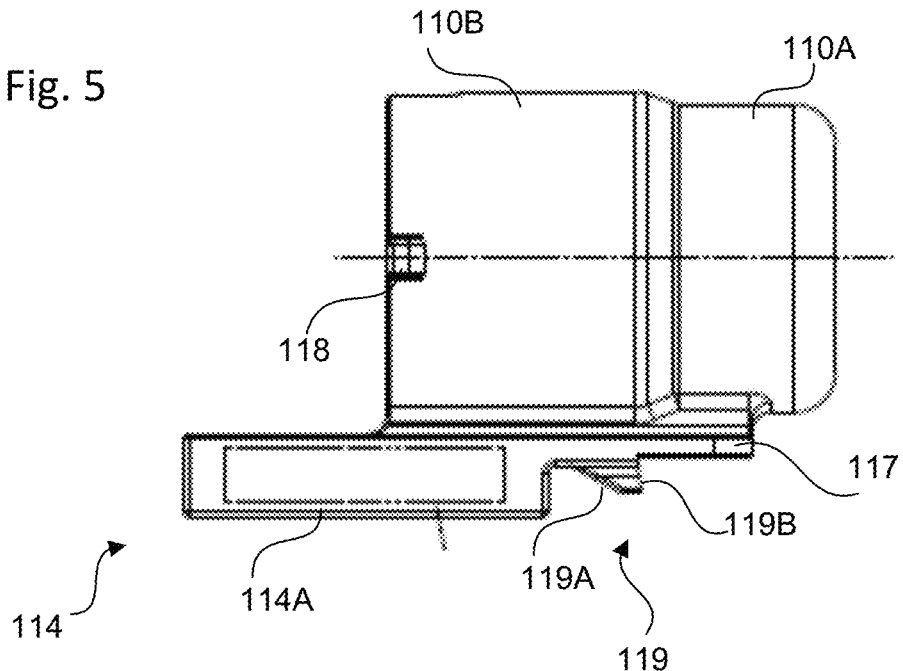
FIGS. 5 and 6 are side and end views, respectively, of a housing of the valve assembly of FIG. 1.

Best seen in FIG. 4, valve assembly 100 also includes a pair of seal members 106, 108, which are disposed between the outer surface of fluid injector 102 an the inner surface of cup 104. Seal members 106, 108 are constructed from a resilient material. In an example embodiment, seal members 106, 108 are O-rings. Seal members 106, 108 each prevents fluid from passing between cup 104 and fluid injector 102, and particularly prevents fluid from entering the actuator unit of fluid injector 102. Seal members 106, 108 are disposed in spaced apart relation to each other within cup 104. Seal member 106 surrounds a portion of fluid inlet port 102H and seal member 108 may be disposed at least partly in a groove defined along the outer radial surface of fluid injector 102. Seal member 106 is sized such that the seal member holds fluid injector 102 in a fixed, stable position within cup 104.

Referring to FIGS. 1-8, valve assembly 100 includes a lower housing 110 which is connected to, disposed along and surrounds a downstream portion of fluid injector 102, relative to the direction of fluid flow through fluid injector 102. Lower housing 110 includes a first portion 110A, a second portion 110B and an end portion 110C. First portion 110A and second portion 110B are each largely cylindrical in shape, with the inner and outer diameter of first portion 110A being smaller than the inner and outer diameter, respectively, of second portion 110B. End portion 110C extends radially inwardly from a longitudinal or axial end of first portion 110A. End portion 110C has an annular shape, resulting in a central aperture that is sized for extending fluid outlet port 102J therethrough.

As shown in FIG. 4, valve assembly 100 includes a seal member 112 which is disposed between the outer surface of fluid injector 102 an the inner surface of lower housing 110. Seal member 112 is constructed from a resilient material. In an example embodiment, seal member 112 is an O-ring. Seal member 112 prevents fluid from passing between lower housing 110 and fluid injector 102, and particularly prevents fluid from entering the actuator unit of fluid injector 102. Seal member 112 may be disposed at least partly in a groove defined along the outer radial surface of fluid injector 102. Seal member 112 may further partly surround and/or is positioned against and contacts fluid outlet port 102J. Seal member 112 is sized to hold fluid injector 102 in a stable position within lower housing 110.

Valve assembly 100 further includes an attachment mechanism for attaching or connecting together cup 104 and lower housing 110. Best seen in FIGS. 1-3, 6 and 8, the attachment mechanism is formed as part of cup 104 and lower housing 110. The attachment mechanism includes one or more arms 116 which extends between cup 104 and lower housing 110, and one or more tab members or detents 118 which engages with the at least one arm 116. Specifically, an arm 116 may extend from either cup 104 or lower housing 110, and a corresponding tab member 118 may extend from the other of cup 104 and lower housing 110 which does not include arm 116. In the drawings, two arms 116 extend from cup 104 and engage with tab members 118 disposed on lower housing 110. It is understood that more or less arms 116 and tab members 118 may be used.

Each arm 116 includes a slot or aperture 116A defined through the arm. The dimensions, i.e., the length, width and thickness, of each arm 116 are selected so that the distal end of arm 116 is able to resiliently deflect in a lateral or radial direction from cup 104 in order to allow engagement with a corresponding tab member 118. Best seen in FIG. 3, the distal end portion of each arm 116 includes a gradually reduced or tapered thickness such that the distal end of arm 116 is spaced from lower housing 110.

Each tab member 118 is sized to as to extend through a corresponding slot 116A. A height of tab member 118 and/or an amount which tab member 118 protrudes from lower housing 110 is greater than a thickness of arm 116. This ensures that arms 116 and tab members 118 do not easily disengage from each other.

During assembly, seal members 106 and 108 are positioned around fluid injector 102. Cup 104 is slid over fluid inlet port 102H and positioned around fluid injector 102 and seal members 106, 108 so that fluid injector 102 is stably positioned with cup 104 and the seal members form a seal between fluid injector 102 and cup 104. Similarly, seal member 112 is positioned around fluid injector 102, and lower housing 110 is slid over fluid outlet port 102J and positioned around fluid injector 102 and seal member 112. As one or both of cup 104 and lower housing 110 are nearing their corresponding final positions along fluid injector 102, tab members 118 initially contact corresponding arms 116 which cause the tapered, distal ends of arms 116 to flex or deflect radially outwardly from lower housing 110 and fluid injector 102 until each tab member 118 extends through slot 116A of a corresponding arm 116, at which point the distal end of arm 116 resiliently returns to its undeflected position. This results in a snap-fit engagement between cup 104 and lower housing 110. Cup 104 and lower housing 110 may be disengaged from each other by manually deflecting the distal end of each arm 116 while pulling cup 104 and lower housing 110 in opposite directions until tab members 118 are no longer disposed within slots 116A.

Figure 6:
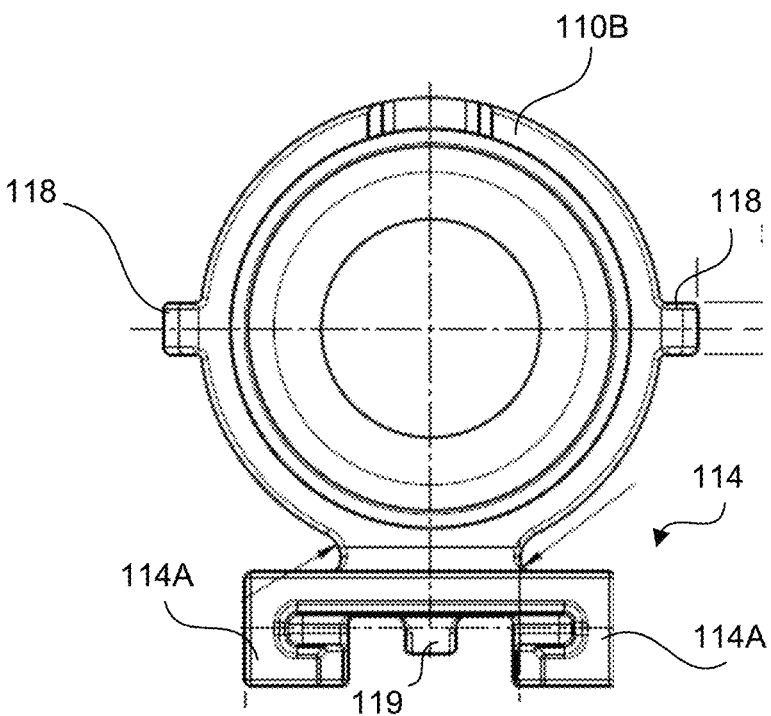

Valve assembly 100 further includes a bracket 114 for connecting to an anchor member 115 which is configured for attachment within a vehicle. Bracket 114 extends from and, in an example embodiment, is integrally formed with lower housing 110 as a unitary component. As shown in FIGS. 1-2, 4, and 5-8, bracket 114 extends from second portion 110B of lower housing 110. Bracket 114 has a largely rectangular prism shape with a cutout portion. In an example embodiment, the cutout portion includes a slot centrally defined through bracket 114 in a longitudinal direction, a central portion of which extends to the outermost side of bracket 114, relative to lower housing 110. This results in bracket 114 including longitudinal or lengthwise side segments 114A which have a largely L-shape and inverted L-shape, as shown in FIG. 6. Lengthwise side segments 114A form ledges which engage with anchor element 115, as discussed below.

Bracket 114 further includes a detent 119 (FIGS. 5 and 6) which protrudes from bracket 114. In the example embodiment illustrated in FIGS. 4-6, bracket 114 includes an extension 117 which extends in a longitudinal direction from the rectangular prism having the cutout portion. Detent 119 includes an angled surface 119A which extends at an oblique angle from extension 117 relative to the longitudinal and lateral axes of bracket 114. A distal end of angled surface 119A reaches a first surface that is largely parallel with the longitudinal axis of bracket 114. A second surface 119B is largely parallel with a lateral axis of bracket 114, largely orthogonal to the first surface, and extends between the first surface and extension 117. Detent 119 facilitates a secure attachment to anchor element 115.

Anchor element 115 is used to fixedly attach valve assembly 100 within a vehicle. In an example embodiment, anchor element 115 is a conventional anchor element, such as an anchor element manufactured by HellermanTyton. Referring to FIGS. 9 and 10, anchor element 115 includes rectangular fir tree connector 130 with deflectable tips 132. Tips 132 are configured to deflect in an upward direction, as shown in FIGS. 4 and 8-10, towards fluid injector 102, but do not deflect in a direction away therefrom. Fir tree connector 130 is sized for downward insertion into an aperture within a vehicle. Once inserted, fir tree connector 130 resists withdrawal from the vehicle aperture.

Figure 7:
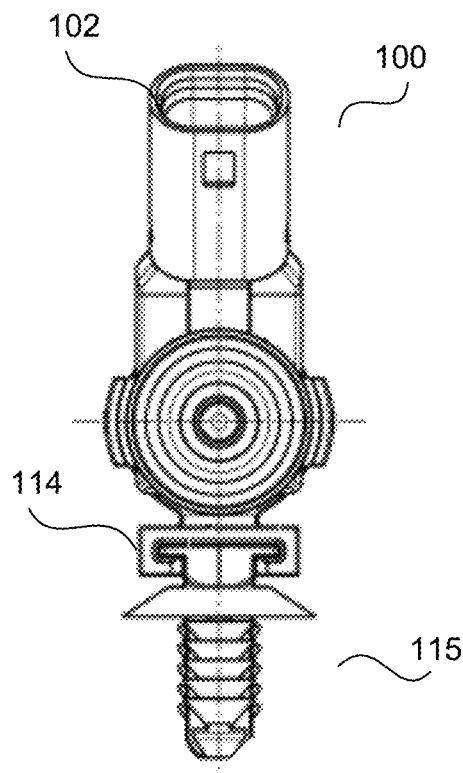
FIGS. 7 and 8 are end and side views, respectively, of the valve assembly and anchor of FIG. 1.
Figure 8:
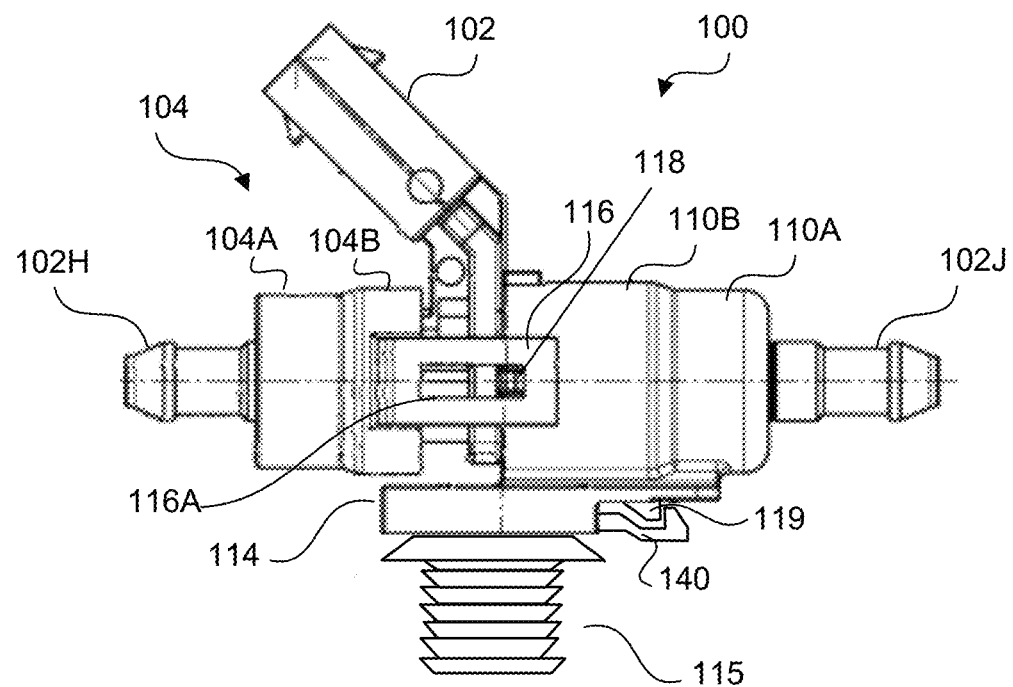

Anchor element 115 further includes a valve connector portion 134 which is sized and shaped to engage with bracket 114. In particular, valve connector portion 134 includes extensions 136 which extend laterally outwardly form an upper block portion 138 of connector portion 134. Extensions 136 extend in a lateral direction along lengthwise and/or longitudinal edges of upper block portion 138. As shown in FIG. 7, extensions 136 and upper block portion 134 are dimensioned for fitting within the cutout portion of bracket 114. Anchor element 115 further includes an arm 140 which extends from a longitudinal end portion of upper block portion 138. A distal end of arm 140 includes an (oblique) angled surface 142 leading to a ledge 144 that is angled to be largely parallel with a longitudinal axis of anchor element 115.

Bracket 114 attaches to anchor element 115 in a snap-fit engagement by sliding upper block portion 138 and extensions 136 within the cutout of the rectangular prism of bracket 114, so that extensions 136 rest on, are held in place by, and/or are positioned against side segments 114A of bracket 114. During sliding of upper block portion 138 within the cutout, the angled surface 142 of arm 140 of anchor element 115 contacts angled surface 119A of detent 119, which causes arm 140 to be temporarily deflected until ledge 144 of arm 140 passes angled surface 119A and the associated first surface of detent 119, whereupon arm 140 returns to its undeflected state, with ledge 144 positioned adjacent second surface 119B of detent 119. Bracket 114 is detached from anchor element 115 by manually lifting the distal end of arm 140 of anchor element 115 so that the distal end has sufficient clearance from detent 119, while slidingly withdrawing upper block 138 from the cutout portion of the rectangular prism of bracket 114.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

The invention claimed is:

1. A valve assembly for washing cameras or sensors of a vehicle, comprising:
   a fluid injector comprising a fluid inlet, a fluid outlet, and a fluid passage in fluid communication with the fluid inlet and the fluid outlet;
   a cup disposed over an upstream portion of the fluid injector, relative to a direction of fluid flow through the fluid injector;
   a lower housing surrounding a downstream portion of the fluid injector, relative to the direction of fluid flow therethrough; and
   a bracket extending from the lower housing, the bracket configured for connecting to an anchor member for attachment within the vehicle.

2. The valve assembly of claim 1, wherein the bracket is integrally formed as a unitary member with the lower housing.

3. The valve assembly of claim 1, wherein the bracket extends from an outer radial surface of the lower housing, and a longitudinal axis of the lower housing is orthogonal to a longitudinal axis of the anchor member when the lower housing is connected thereto.

4. The valve assembly of claim 3, wherein the bracket has a prism shape with a pair of lengthwise side segments which form a cutout within the bracket, a portion of the anchor member being disposed in the cutout when the anchor member is connected to the bracket.

5. The valve assembly of claim 1, wherein the cup and the lower housing are connected together.

6. The valve assembly of claim 1, further comprising an attachment mechanism formed as part of the cup and the lower housing, comprising at least one arm which extends from one of the cup and the lower housing and at least one tab member disposed on and extending from the other of the cup and the lower housing, the at least one tab member engaging with the at least one arm member when the cup and the lower housing are attached to each other.

7. The valve assembly of claim of claim 6, wherein the attachment mechanism comprises a plurality of arm members and a plurality of tab members, each arm member engaging with a tab member when the cup and the lower housing are attached to each other.

8. The valve assembly of claim 1, further comprising at least one seal member disposed between an outer surface of the fluid injector and an inner surface of the cup, the at least one seal member positioning the fluid injector within the cup and preventing fluid from passing between the cup and the fluid injector.

9. The valve assembly of claim 1, further comprising at least one seal member disposed between an outer surface of the fluid injector and an inner surface of the cup, the at least one seal member preventing movement of the fluid injector within the cup member.

10. The valve assembly of claim 9, wherein the fluid injector comprises an input port and the at least one seal member surrounds a portion of the input port.

11. The valve assembly of claim 1, further comprising a seal member disposed between an outer surface of the fluid injector and an inner surface of the lower housing, the seal member preventing fluid from passing between the fluid injector and the lower housing.

12. The valve assembly of claim 1, wherein the fluid injector includes an actuator unit comprising a coil, a stationary pole piece, a spring and a movable armature in contact with the spring; and a valve unit comprising a valve seat and a valve needle configured to move with the armature between a closed position in which an end portion of the valve needle engages with the valve seat to prevent fluid from exiting the fluid injector from the fluid outlet, and an open position in which the end portion of the valve needle is spaced apart from the valve seat so as to allow fluid to pass through the fluid injector and exit through the fluid outlet.

13. A valve assembly for washing cameras or sensors of a vehicle, comprising:
a fluid injector comprising a fluid inlet, a fluid outlet, and a fluid passage in fluid communication with the fluid inlet and the fluid outlet;
a cup surrounding an upstream portion of the fluid injector, relative to a direction of fluid flow through the fluid injector;
a lower housing surrounding a downstream portion of the fluid injector, relative to the direction of fluid flow therethrough;
a bracket extending from the lower housing, the bracket configured for connecting to an anchor member for attachment within the vehicle; and
a seal member disposed between an inner surface of the cup member and the fluid injector, the seal member positioning the fluid injector within the cup member.

14. The valve assembly of claim 13, wherein the fluid injector includes an inlet port and the seal member surrounds a portion of the inlet port.

15. The valve assembly of claim 13, wherein the bracket is configured so that a longitudinal axis of the fluid injector is orthogonal to a longitudinal axis of the anchor member when the bracket is connected thereto.

16. The valve assembly of claim 13, wherein the cup and the lower housing are removably attached to each other and comprise a plurality of arms, each arm extending from one of the cup and the lower housing, and a plurality of tabs protruding from the other of the cup and the lower housing, each arm engaging with a corresponding tab when connecting the cup to the lower housing.

17. The valve assembly of claim 16, wherein each arm extends from the one of the cup and the lower housing such that a distal end of the arm is resiliently deflectable, each arm includes a slot or aperture, and each tab protrudes from the other of the cup and the lower housing and is disposed in the slot or aperture of a corresponding arm when the cup is attached to the lower housing.

18. The valve assembly of claim 13, wherein the lower housing and the cup are integrally formed as a unitary member.

19. The valve assembly of claim 13, wherein the bracket extends from an outer radial surface of the lower housing such that a longitudinal axis of the bracket is parallel to a longitudinal axis of the fluid injector.

20. The valve assembly of claim 13, further comprising a seal member disposed between the lower housing and the fluid injector, wherein the fluid injector further includes an outlet port at which the fluid outlet is located, the seal member disposed against and contacting the outlet port.

* * * * *